(12) United States Patent
Lynch et al.

(10) Patent No.: US 6,729,636 B1
(45) Date of Patent: May 4, 2004

(54) UTILITY VEHICLE HITCH DEVICE

(76) Inventors: Phil Lynch, 3204 Majestic Dr., Huntsville, TX (US) 77340; Danny Scarborough, Rte. 1, Box 1636, Shelbyville, TX (US) 75973

( * ) Notice: Subject to any disclaimer, the term of this patent is extended or adjusted under 35 U.S.C. 154(b) by 0 days.

(21) Appl. No.: 10/223,032

(22) Filed: Aug. 16, 2002

(51) Int. Cl.[7] ................................................. B60D 1/00
(52) U.S. Cl. .................................. 280/490.1; 280/461.1
(58) Field of Search ........................... 280/490.1, 461.1, 280/478.1, 456.1, 492, 504; D12/162

(56) References Cited

U.S. PATENT DOCUMENTS

| | | | |
|---|---|---|---|
| 3,393,924 A | * | 7/1968 | Silver ....................... 280/461.1 |
| D279,179 S | * | 6/1985 | Landry, Jr. ................. D12/162 |
| D369,580 S | * | 5/1996 | Hartwig ..................... D12/162 |
| 5,645,292 A | | 7/1997 | McWilliams et al. |
| 5,707,072 A | | 1/1998 | Hopper |
| 5,746,275 A | | 5/1998 | Cross et al. |
| 6,126,189 A | * | 10/2000 | Venis ......................... 280/511 |
| 6,341,795 B1 | * | 1/2002 | Zerkel ....................... 280/490.1 |

* cited by examiner

Primary Examiner—Lesley D. Morris
Assistant Examiner—Matthew Luby

(57) ABSTRACT

A utility vehicle hitch device for securing an utility attachment to a utility vehicle. The utility vehicle hitch device includes a mounting portion being designed for being coupled to the utility vehicle. A stanchion portion is coupled to the mounting portion whereby the stanchion portion is designed for being positioned in a spaced relationship to the utility vehicle. A receiver portion is coupled to the stanchion portion whereby the receiver portion extends outwardly from the stanchion portion opposite the mounting portion. The stanchion portion is designed for receiving a hitch member whereby the receiver portion secures the utility attachment to the utility vehicle when the utility attachment is coupled to the hitch member.

10 Claims, 4 Drawing Sheets

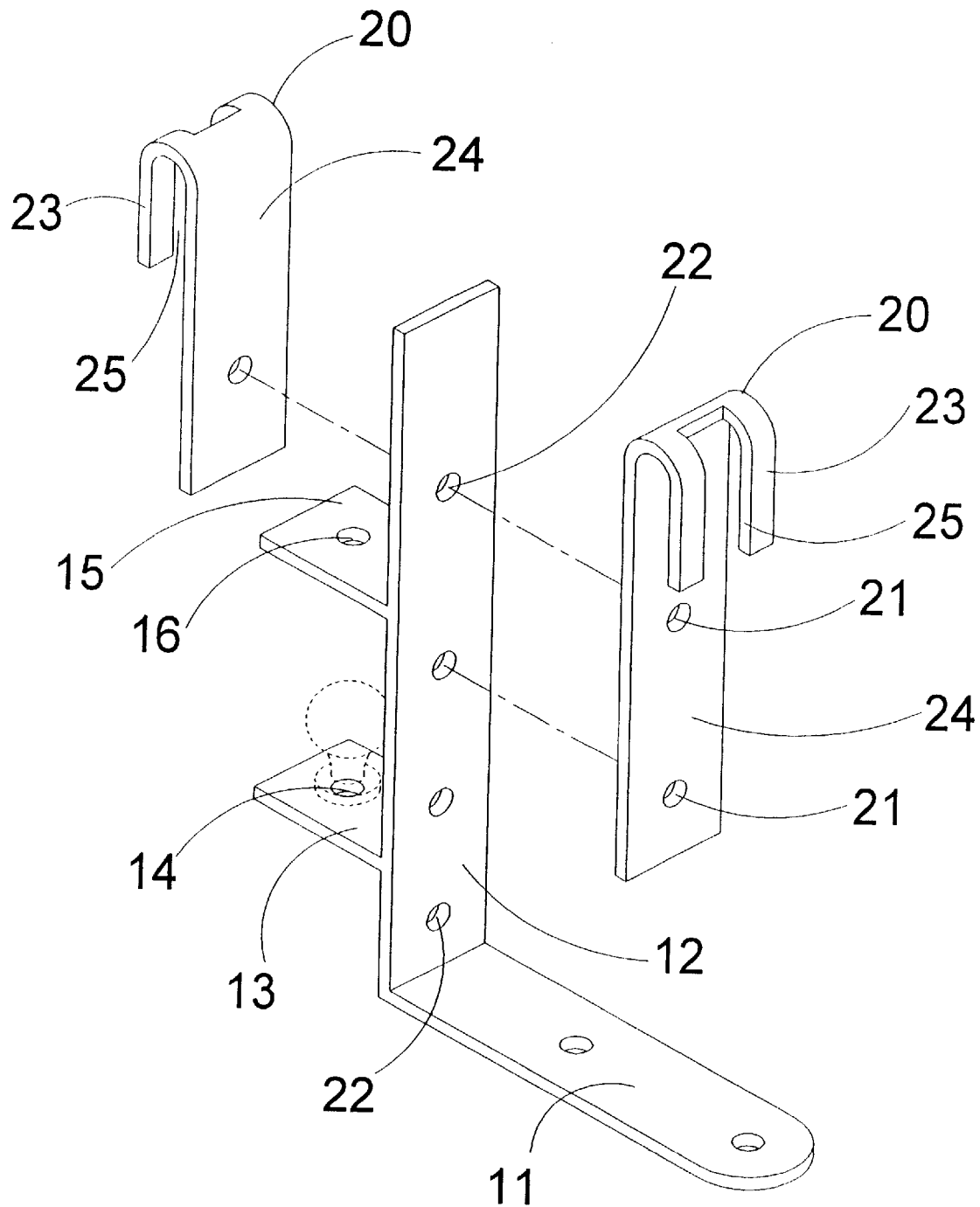

UTILITY VEHICLE HITCH DEVICE

BACKGROUND OF THE INVENTION

1. Field of the Invention

The present invention relates to receiver hitch systems and more particularly pertains to a new utility vehicle hitch device for securing an utility attachment to a utility vehicle.

2. Description of the Prior Art

The use of receiver hitch systems is known in the prior art. U.S. Pat. No. 5,645,292 describes a device for connecting to an all terrain vehicle to transport objects. Another type of receiver hitch system is U.S. Pat. No. 5,707,072 having a system being coupled to an all terrain vehicle for allow utility attachments to being coupled to the all terrain vehicle. U.S. Pat. No. 5,746,275 has a hitch being coupled to an all terrain vehicle to allow implements coupled to the all terrain vehicle.

While these devices fulfill their respective, particular objectives and requirements, the need remains for a system that has certain improved features accomodating utility attachments of different hitch heights.

SUMMARY OF THE INVENTION

The present invention meets the needs presented above by providing a receiver portion and a coupler portion at differing heights to receive utility attachments of different heights.

Still yet another object of the present invention is to provide a new utility vehicle hitch device that allows utility attachments having tow bars to being coupled to the all terrain vehicle.

To this end, the present invention generally comprises a mounting portion being designed for being coupled to the utility vehicle. A stanchion portion is coupled to the mounting portion whereby the stanchion portion is designed for being positioned in a spaced relationship to the utility vehicle. A receiver portion is coupled to the stanchion portion whereby the receiver portion extends outwardly from the stanchion portion opposite the mounting portion. The stanchion portion is designed for receiving a hitch member whereby the receiver portion secures the utility attachment to the utility vehicle when the utility attachment is coupled to the hitch member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an exploded perspective view of an embodiment of the present invention.

DESCRIPTION OF THE PREFERRED EMBODIMENT

Figure 1:
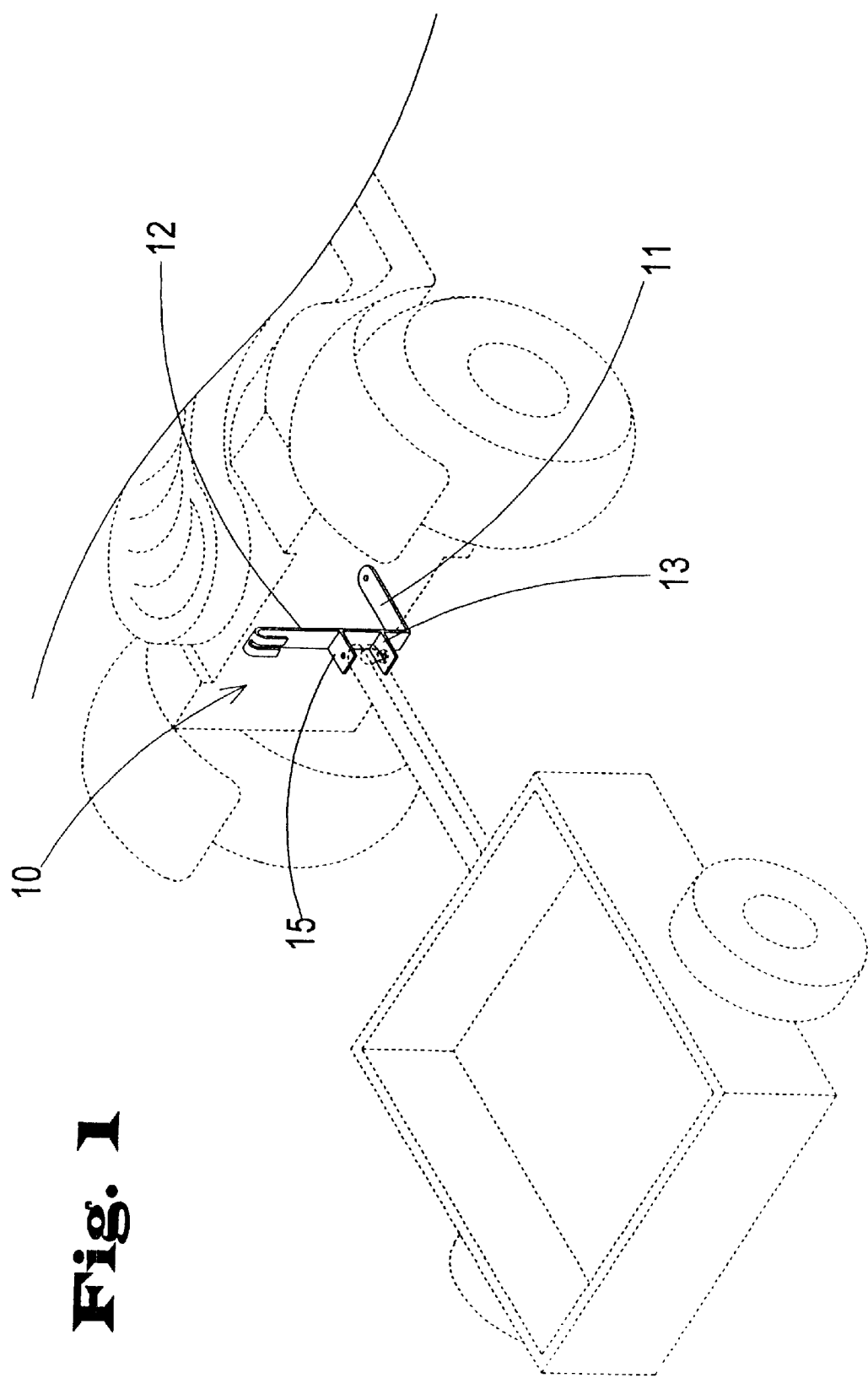
FIG. 1 is a perspective view of a new utility vehicle hitch device according to the present invention shown in use.
Figure 2:
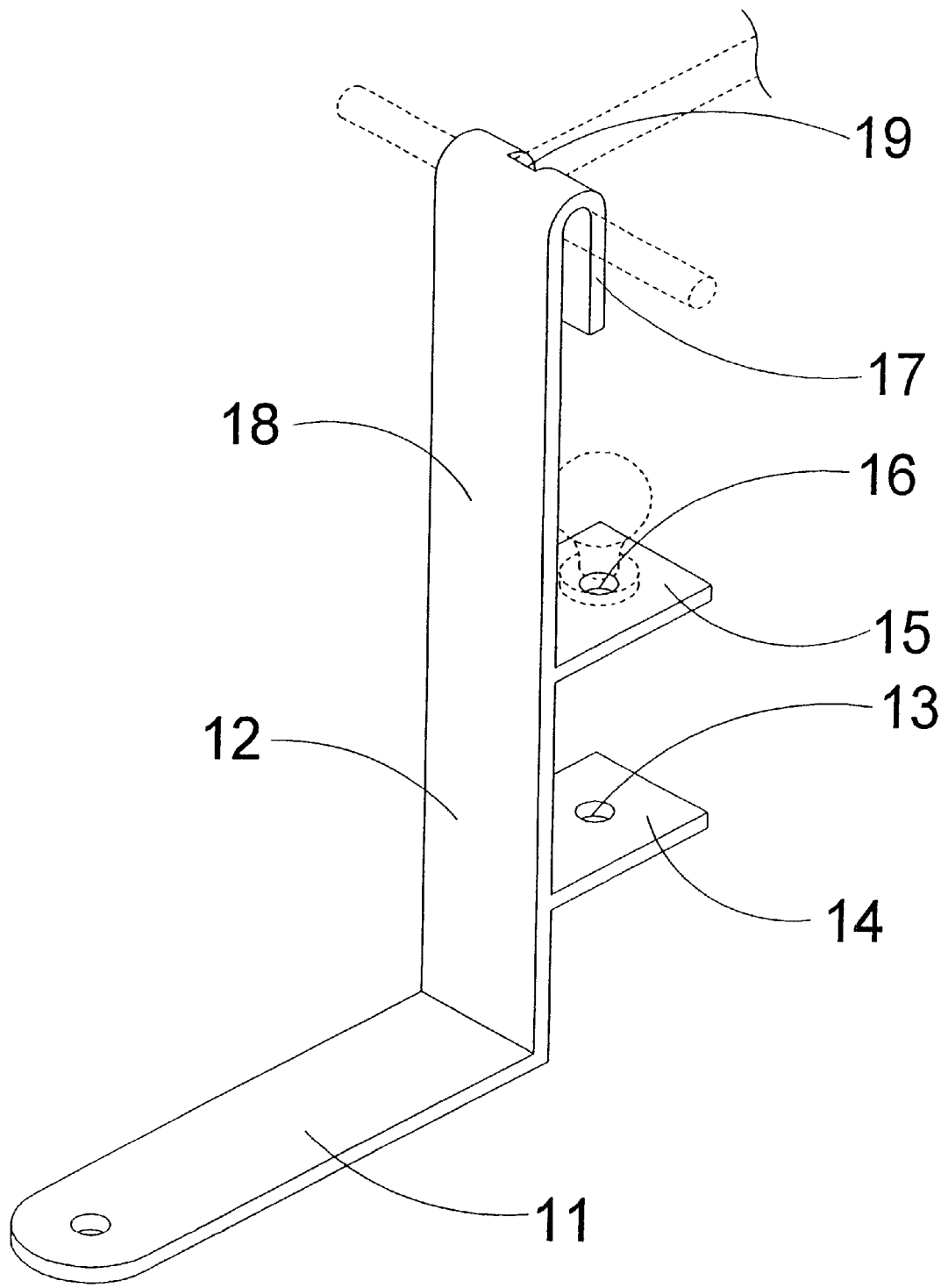
FIG. 2 is a perspective view of the present invention shown in use.
Figure 3:
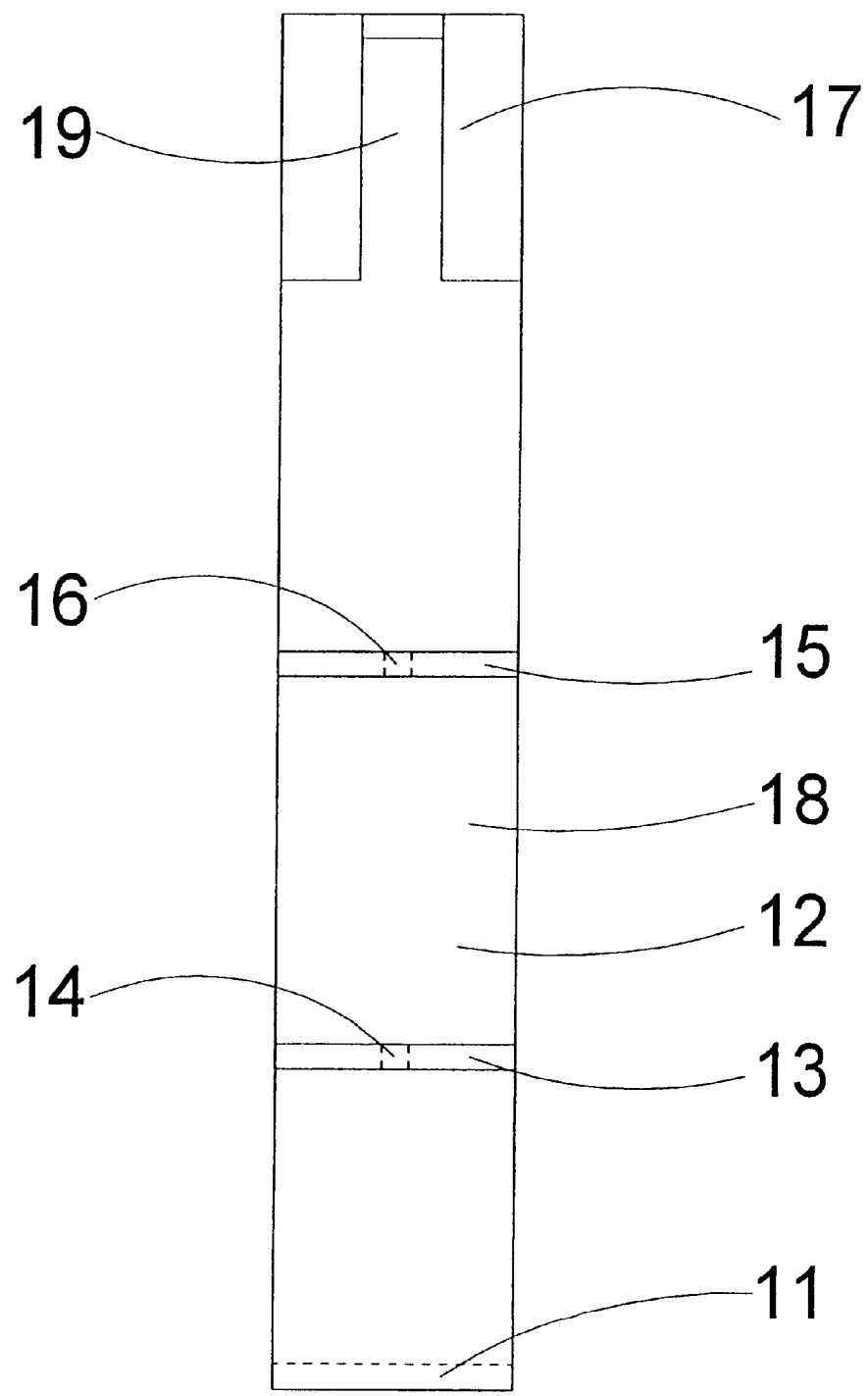
FIG. 3 is a front view of the present invention.

With reference now to the drawings, and in particular to FIGS. 1 through 4 thereof, a new utility vehicle hitch device embodying the principles and concepts of the present invention and generally designated by the reference numeral 10 will be described.

As best illustrated in FIGS. 1 through 4, the utility vehicle hitch device 10 generally comprises a mounting portion 11 being designed for being coupled to the utility vehicle, such as an all terrain vehicle. A stanchion portion 12 is coupled to the mounting portion 11 whereby the stanchion portion 12 is designed for being positioned in a spaced relationship to the utility vehicle.

A receiver portion 13 is coupled to the stanchion portion 12 whereby the receiver portion 13 extends outwardly from the stanchion portion 12 opposite the mounting portion 11. The receiver portion 13 is designed for selectively receiving a hitch member whereby the receiver portion 13 secures the utility attachment, such as a trailer, to the utility vehicle when the utility attachment is coupled to the hitch member. The receiver portion 13 comprises a receiver aperture 14 extending through the receiver portion 13. The receiver aperture 14 is designed for selectively receiving the hitch member when the hitch member is to coupled to the receiver portion 13. The receiver portion 13 is positioned about 4-½ inches above the mounting portion 11.

A coupler portion 15 is coupled to the stanchion portion 12 whereby the coupler portion 15 outwardly extends from the stanchion portion 12 opposite the mounting portion 11. The coupler portion 15 is positioned in a spaced relationship to the receiver portion 13 whereby a distance between the coupler portion 15 and the receiver portion 13 permits the utility attachment to be coupled to the hitch member when the hitch member is coupled to the receiver portion 13. The coupler portion 15 is designed for selectively receiving the hitch member whereby the coupler portion 15 is designed for securing the utility attachment to the utility vehicle when the utility attachment is too tall to be coupled to the vehicle with the receiver portion 13. The coupler portion 15 comprises a coupler aperture 16 extending through the coupler portion 15. The coupler aperture 16 is designed for receiving the hitch member when the hitch member is coupled to the coupler portion 15. The coupler portion 15 is positioned about 11-½ inches above the receiver portion 13 to allow for accommodating utility attachments having different hitch height requirements and permitting easy access to the receiver portion 13 when the utility attachment is to secured to the receiver portion 13.

The mounting portion 11 comprises at least one mounting aperture extending through the mounting portion 11. The mounting aperture is designed for permitting a fastener system to extend through the mounting aperture to secure the mounting portion 11 to the utility vehicle.

The stanchion portion 12 comprises a free end 17 positioned opposite the mounting member. The free end 17 of the stanchion portion 12 is folded over whereby the free end 17 extends back along a portion of a length of the stanchion portion 12. The free end 17 is designed for engaging a tow bar of the utility attachment whereby the tow bar is positioned between the free end 17 of the stanchion portion 12 and a main portion 18 of the stanchion portion 12 for securing the utility attachment to the utility vehicle.

The free end 17 of the stanchion portion 12 comprises an engagement slot 19. The engagement slot 19 is designed for selectively receiving an extension bar extending between the tow bar and the utility attachment whereby the engagement slot 19 is for maintaining alignment of the extension bar and the tow bar with the free end 17 of the stanchion portion 12.

In and embodiment, at least one cross bar portion 20 is designed for being selectively secured to the stanchion portion 12. The cross bar portion 20 is designed for selectively receiving a tow bar of the utility attachment for selectively securing the utility attachment to the utility vehicle when the utility attachment does not have a tongue to be coupled to the receiver portion 14. The cross bar portion 20 comprises at least one attachment aperture 21 extending through the cross bar portion 20. The attachment aperture 21 is selectively alignable with one of a plurality of stanchion apertures 22 extending through the stanchion portion 12 whereby the attachment aperture 21 and an associated one of the stanchion apertures 22 are designed for receiving a fastener for coupling the cross bar portion 20 to the stanchion portion 12 when the attachment aperture 21 and one of the stanchion aperture 22 apertures 22 are aligned.

The cross bar portion 20 comprises a distal end 23. The distal end 23 of the cross bar portion 20 is folded over whereby the distal end 23 extends back along a portion of a length of the cross bar portion 20. The distal end 23 is designed for engaging the tow bar of the utility attachment whereby the tow bar is positioned between the distal end 23 of the cross bar portion 20 and a body portion 24 of the cross bar portion 20 for securing the utility attachment to the utility vehicle. The distal end 23 of the cross bar portion 20 comprises an alignment slot 25. The alignment slot 25 is designed for selectively receiving an extension bar extending between the cross bar and the utility attachment whereby the alignment slot 25 is for maintaining alignment of the extension bar and the cross bar with the distal end 23 of the cross bar portion 20.

In use, the user extends the fastener system through the mounting aperture of the mounting portion 11 to secure the mounting portion 11 to the utility vehicle. The hitch member is then selectively extended through the receiver aperture 14 of the receiver portion 13 or the coupler aperture 16 of the coupler portion 15 depending on the height required by the utility attachment. The utility attachment is then secured to the hitch member to secure the utility attachment to the utility vehicle. For utility attachments having a tow bar configuration the tow bar is positioned between the free end 17 of the stanchion portion 12 and the main portion 18 of the stanchion portion 12 with the extension member inserted into the engagement slot 19 so that alignment between the tow bar and the stanchion portion 12 is maintained when the utility attachment is being towed by the utility vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A utility vehicle hitch device for coupling a utility attachment to a utility vehicle; the utility vehicle hitch device comprising:

a mounting portion being adapted for being coupled to the utility vehicle;

a stanchion portion being coupled to said mounting portion such that said stanchion portion is adapted for being positioned in a spaced relationship to the utility vehicle;

a receiver portion being coupled to said stanchion portion such that said receiver portion extends outwardly from said stanchion portion opposite said mounting portion, said receiver portion being adapted for selectively receiving a hitch member such that said receiver portion secures the utility attachment to the utility vehicle when the utility attachment is coupled to the hitch member;

at least one cross bar portion being adapted for being selectively secured to said stanchion portion, said cross bar portion being adapted for selectively receiving a tow bar of the utility attachment for selectively securing the utility attachment to the utility vehicle when the utility attachment does not have a tongue to be coupled to said receiver portion; and said cross bar portion comprising a distal end, said distal end of said cross bar portion being folded over such that said distal end extends back along a portion of a length of said cross bar portion, said distal end being adapted for engaging the tow bar of the utility attachment such that the tow bar is positioned between said distal end of said cross bar portion and a body portion of said cross bar portion for securing the utility attachment to the utility vehicle.

2. The utility vehicle hitch device as set forth in claim 1, further comprising:

said receiver portion comprising a receiver aperture extending through said receiver portion, said receiver aperture being adapted for selectively receiving the hitch member when the hitch member is to coupled to said receiver portion.

3. The utility vehicle hitch device as set forth in claim 1, further comprising:

a coupler portion being coupled to said stanchion portion such that said coupler portion outwardly extends from said stanchion portion opposite said mounting portion, said coupler portion being positioned in a spaced relationship to said receiver portion such that a distance between said coupler portion and said receiver portion permits the utility attachment to be coupled to the hitch member when said hitch member is coupled to the receiver portion, said coupler portion being adapted for selectively receiving the hitch member such that said coupler portion is adapted for securing the utility attachment to the utility vehicle when the utility attachment is too tall to be coupled to the vehicle with said receiver portion.

4. The utility vehicle hitch device as set forth in claim 3, further comprising:

said coupler portion comprising a coupler aperture extending through said coupler portion, said coupler aperture being adapted for receiving the hitch member when the hitch member is coupled to said coupler portion.

5. The utility vehicle hitch device as set forth in claim 1, further comprising:

said mounting portion comprising at least one mounting aperture extending through said mounting portion, said mounting aperture being adapted for permitting a fastener system to extend through said mounting aperture to secure said mounting portion to the utility vehicle.

6. The utility vehicle hitch device as set forth in claim 1, further comprising:

said stanchion portion comprising a free end positioned opposite said mounting member, said free end of said stanchion portion being folded over such that said free end extends back along a portion of a length of said stanchion portion, said free end being adapted for engaging a tow bar of the utility attachment such that the tow bar is positioned between said free end of said stanchion portion and a main portion of said stanchion portion for securing the utility attachment to the utility vehicle.

7. The utility vehicle hitch device as set forth in claim 6, further comprising:

said free end of said stanchion portion comprising an engagement slot, said engagement slot being adapted for selectively receiving an extension bar extending between the tow bar and the utility attachment such that said engagement slot is for maintaining alignment of the extension bar and the tow bar with said free end of said stanchion portion.

8. The utility vehicle hitch device as set forth in claim 1, further comprising:

said cross bar portion comprising at least one attachment aperture extending through said cross bar portion, said attachment aperture being selectively alignable with one of a plurality of stanchion apertures extending through said stanchion portion such that said attachment aperture and an associated one of said stanchion apertures is adapted for receiving a fastener for coupling said cross bar portion to said stanchion portion when said attachment aperture and one of said stanchion apertures are aligned.

9. The utility vehicle hitch device as set forth in claim 1, further comprising:

said distal end of said cross bar portion comprising an alignment slot, said alignment slot being adapted for selectively receiving an extension bar extending between the cross bar and the utility attachment such that said alignment slot is for maintaining alignment of the extension bar and the cross bar with said distal end of said cross bar portion.

10. A utility vehicle hitch device for coupling a utility attachment to a utility vehicle; the utility vehicle hitch device comprising:

a mounting portion being adapted for being coupled to the utility vehicle;

a stanchion portion being coupled to said mounting portion such that said stanchion portion is adapted for being positioned in a spaced relationship to the utility vehicle;

a receiver portion being coupled to said stanchion portion such that said receiver portion extends outwardly from said stanchion portion opposite said mounting portion, said receiver portion being adapted for selectively receiving a hitch member such that said receiver portion secures the utility attachment to the utility vehicle when the utility attachment is coupled to the hitch member;

said receiver portion comprising a receiver aperture extending through said receiver portion, said receiver aperture being adapted for selectively receiving the hitch member when the hitch member is to coupled to said receiver portion;

a coupler portion being coupled to said stanchion portion such that said coupler portion outwardly extends from said stanchion portion opposite said mounting portion, said coupler portion being positioned in a spaced relationship to said receiver portion such that a distance between said coupler portion and said receiver portion permits the utility attachment to be coupled to the hitch member when said hitch member is coupled to the receiver portion, said coupler portion being adapted for selectively receiving the hitch member such that said coupler portion is adapted for securing the utility attachment to the utility vehicle when the utility attachment is too tall to be coupled to the vehicle with said receiver portion;

said coupler portion comprising a coupler aperture extending through said coupler portion, said coupler aperture being adapted for receiving the hitch member when the hitch member is coupled to said coupler portion;

said mounting portion comprising at least one mounting aperture extending through said mounting portion, said mounting aperture being adapted for permitting a fastener system to extend through said mounting aperture to secure said mounting portion to the utility vehicle;

said stanchion portion comprising a free end positioned opposite said mounting member, said free end of said stanchion portion being folded over such that said free end extends back along a portion of a length of said stanchion portion, said free end being adapted for engaging a tow bar of the utility attachment such that the tow bar is positioned between said free end of said stanchion portion and a main portion of said stanchion portion for securing the utility attachment to the utility vehicle; and said free end of said stanchion portion comprising an engagement slot, said engagement slot being adapted for selectively receiving an extension bar extending between the tow bar and the utility attachment such that said engagement slot is for maintaining alignment of the extension bar and the tow bar with said free end of said stanchion portion.

\* \* \* \* \*